Sept. 15, 1931.  E. BRANDUS  1,823,852
MAGNETIC SEPARATING COMPOSITION
Filed April 29, 1929
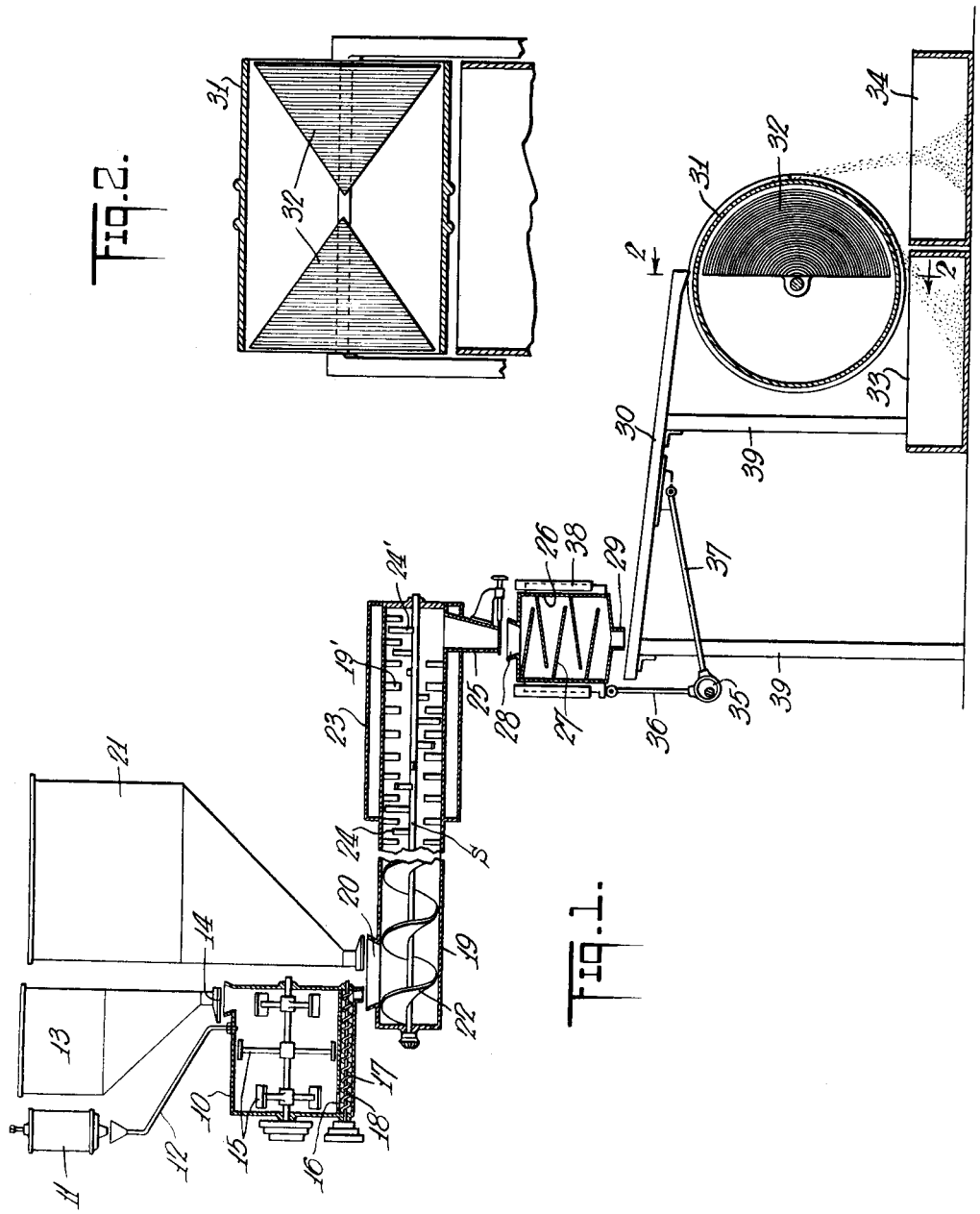
INVENTOR
*Ernst Brandus*
BY
*Dean, Fairbank, Obright & Hirsch*
*his* ATTORNEYS.

Patented Sept. 15, 1931

1,823,852

UNITED STATES PATENT OFFICE

ERNST BRANDUS, OF BERLIN, GERMANY, ASSIGNOR TO CRAWFORDSVILLE SEED COMPANY, OF CRAWFORDSVILLE, INDIANA, A CORPORATION OF INDIANA

MAGNETIC SEPARATING COMPOSITION

Application filed April 29, 1929. Serial No. 359,180.

Prior magnetic seed sorting methods are subject to certain objections which it is the purpose of the present invention to overcome.

So called dry sorting methods which involve mixing a dry magnetic powder with the dry seeds to be sorted, rely upon the adhesion of the magnetic powder to the foreign weed seeds which have broken, hairy, rough or pitted surfaces and the failure of such material to cling to the smooth surfaced desirable seeds. Such methods are apt to raise a dust cloud in the operating room which is injurious to the health of the operatives. They sort undependably, in the first place because all of the foreign seeds may not collect the magnetic powder and in the second place because the sorting magnet may frequently pick the powder off of the dry foreign seeds without actually attracting the seeds tnemselves. Furthermore, where violent agitation is resorted to for more intimate adhesion between the foreign seeds and the paramagnetic material, many of the good seeds become broken and crushed.

The so-called wet processes rely upon developing the inherent adhesiveness of certain of the undesirable seeds by the addition of a considerable proportion of water, and in this manner causing adhesion of the magnetic material to the undesirable seeds. Some of the foreign seeds however fail to develop the necessary adhesive qualities in the presence of moisture, and the process moreover results in soiling, gumming and otherwise injuring the sorting machinery. Furthermore, the process requires painstaking and expert care, otherwise oversupply of moisture would result in subsequent molding, freezing or germination of the good seeds in storage.

A third process involves coating all of the seeds, both good and bad with a magnetic paste, drying the paste and then abrading or otherwise removing the paste from the smooth-surfaced desirable seeds so that the undesirable ones are picked out by the magnetic sorter. Where conventional paramagnetic sorting means are utilized, the paste sometimes fails to adhere to the undesirable seeds when the seed mass is subjected to abrading action, and the good seeds are soiled by free carbon working out of the iron filings or other powdered magnetic base which is used in the paste.

Many of the disadvantages noted above in connection with the various sorting processes are directly traceable to the character of the paramagnetic seed sorting medium which is used. This medium in the case of a dry process fails to effect proper sorting and raises dust clouds and in the wet process and the paste process soils both machinery and the seeds. Prior paramagnetic seed sorting mediums furthermore have been expensive, overly supplied with free carbon and generally unsuitable for the production of a substantially homogeneous clean paramagnetic paste.

An important feature of the present invention therefore, is the special type of magnetic material which is mixed with water to form a slightly adhesive quick-drying paste adapted actually to encase seeds being sorted. This material is comparatively light in weight, contains relatively small proportion of magnetic particles and yet the particles are of such high permeability that their response to the field of the sorting magnet is far greater than in the case of prior mixtures which contain a much larger proportion both by volume and weight of paramagnetic material.

The material is ordinarily manufactured and sold in powder form and quickly forms the quick-drying and readily removable paste or cement when mixed with a proper proportion of water. The base of the powder is finely comminuted sponge iron. The specific gravity of this material is low. It is extremely porous even in very small particles. Its purity is such that it is of high magnetic permeability. It is free from the uncombined carbon which in prior mixtures tends to soil the seeds and due to the minute channels in the material it has a tendency avidly to adsorb various adhesive mediums, such, for instance, as lime water, flour paste, calcium carbonate, oil and other carriers of moisture, without enlarging the size of the sponge particles themselves.

A preferred method of producing the impalpable powder having the sponge iron base and which is subsequently mixed with water to form the seed coating paste is to place fairly small fragments of sponge iron in a centrifugal comminuting machine in the presence of a fluid adhesive material such, for instance, as a flour and water paste and also in the presence of iron oxide and lime. By agitation and comminution of the material the sponge iron is reduced to an impalpable powder with the fine channels of each powder particle substantially filled with the adhesive paste including the small iron oxide particles, which both strengthen the structure of the sponge iron and add to its magnetic qualities. The final product which emerges from the centrifuge is a very fine, dark gray powder practically dry to the touch and having no tendency to cake or clot.

This magnetic material is suitable for use with any of the known sorting methods, but is particularly effective for use with the third or paste-forming process. The improved paste-forming process which I prefer involves mixing the powder with a slight amount of water to form a thin adhesive paste, thoroughly mixing this paste with the seed mass and when all of the seeds have been covered with it, drying the paste and subjecting the seed mass to an agitating and abrading action which serves to remove paste from substantially only the smooth surfaced seeds. Preferably on the way to the sorter the seed mass is additionally agitated and tumbled so that the good seeds are entirely free from the paste by the time the seed mass reaches the sorting magnet.

In manufacturing the powder, the proportion of water adherent utilized is important. The sponge iron particles are under-supplied with the flour and water paste and with the water absorbent lime in the centrifuge, so that the particles normally have no tendency to cohere. When water is added to the particles, it develops their stickiness and the particles are then so over-supplied with moisture that they cohere and form a pasty mass. The structure of this mass consists of sponge iron particles, cohesively attached to each other and with the interspaces between them filled with water.

When a seed becomes coated with the paste, it is encased in a grille-like shell consisting of cohering iron particles with water interspaces. The application of heat to a coated seed evaporates the water in the interspaces leaving a very loose grille work which may be readily rubbed off in the event that the seed is of the smooth surfaced variety.

The invention may be more fully understood from the following description in connection with the accompanying drawings, wherein:

Fig. 1 is a diagrammatic view principally in section through an apparatus embodying the present invention.

Fig. 2 is a sectional detail through the sorting drum taken approximately on the line 2—2 of Fig. 1.

It is well to note at the outset that the showing of apparatus is extremely diagrammatic and that I do not wish to be limited to any particular apparatus for performing the process. In fact my improved paramagnetic sorting medium is suitable for use with many processes although the apparatus shown is merely illustrative of one of many mechanisms with which the paste process may be carried out.

Measured quantities of water and paramagnetic powder are delivered into a paste mixing chamber 10. The water container 11 delivers into a feed pipe 12 entering chamber 10 and the powder hopper 13 discharges through a gate valve 14 relatively close to the discharge end of the pipe 12. The powder and water are stirred by the blades or paddles 15 which carry the paste resultant from the mixture to the entrance opening 16 in the casing 17 of a screw conveyor 18. The homogeneity of the paste is further enhanced as it is moved along by the conveyor.

A chamber 19 receives the paste from the conveyor 18. The same inlet opening 20 provides entrance both for the paste and for measured quantities of heterogeneous seeds from the hopper 21. Chamber 19 is in the nature of an elongated cylinder and in its entrance end the seeds and the paste are thoroughly commingled, substantially all of the seeds becoming coated with paste. The paste-coated seed mass is moved along by the conveyor 22 toward the opposite end of cylinder 19 and into the heated region which is encircled by the steam jacket 23.

Lugs 24 on shaft S mix the paste or cement and the seeds and gradually force them to the jacket 23 when the heat dries the batch. The seed mass in its passage through the jacket is tumbled, abraded and agitated by short lugs 24' on the shaft S pressing in between lugs 19' extending inward from the chamber 19. During this agitation of the mass the dried paste will be broken, flaked and rubbed off the smooth surfaced seeds, while substantial amounts of the paste cling tenaciously to the foreign weed seeds, which have hairy, sticky, rough or pitted surfaces.

As the seed mass leaves the chamber 19 through the discharge spout 25 substantially all of the desirable seeds will have been freed from paste and the paste removal is rendered even more sure by discharging the seeds into a tumbling mechanism consisting of a cylindrical baffle and jagger chamber 26 provided with a series of staggered inclined baffles 27. The seeds entering the inlet 28 at the top of the container 26 travel successively along the baffles 27 and pass out of the discharge spout 29 at the bottom of the container to the inclined table 30. They travel along this table and spill over on to the magnetic sorting drum 31 which is internally equipped with magnets, such, for instance, as the two semi-conical magnets 32, the apical pole pieces of which are juxtaposed in order that the magnetic field may be most intense at the central region of the drum over which most of the seeds pass. The weed seeds, which still have a certain amount of the magnetic paste adhering to them, are held against the surface of the drum and deposited into the receptacle 33 while the smooth surfaced seeds, free of paste and not subject to magnetic attraction, drop into the receptacle 34.

Means is preferably provided for imparting a vertical jogging movement to the container 26 and a substantially horizontal reciprocating movement to the table 30. One means for accomplishing this result has been diagrammatically shown and consists of an eccentric 35 reciprocating connecting rods 36 and 37 which are coupled to the container and the table respectively. The container is mounted to move vertically in guides 38 and the table is mounted to slide on the top of standards 39.

The process as thus far described follows closely known "paste processes" discussed above.

In order to avoid needless illustration of details, I have omitted the showing of the mechanism for synchronizing the feed of the water and the magnetic powder into the paste mixer 10 and for synchronizing the feed of the paste and the seeds into the chamber 19. Obviously any suitable hopper exit valve mechanism as well as means for keeping the contents of the hoppers in motion may be employed. The supply, agitating, mixing, tumbling and sorting mechanisms have been shown in most diagrammatic fashion throughout and it will be apparent that the drive of the various conveyors, mixers and tumblers may be readily synchronized with each other and with the feed of the material.

Iron sponge as a base material for the powder possesses peculiar advantages because of its magnetic, its chemical and its physical characteristics. It is strongly ferro-magnetic by reason of its high content of metallic iron and is therefore responsive to magnetic fields of much less intensity than are required for handling iron filing, for instance. It therefore permits the use of a magnet of small circumference and requiring little electrical energy.

Chemically the iron sponge is entirely free of uncombined carbon or other elements having any tendency to smudge the material with which it comes in contact.

From a mechanical standpoint, the extremely high porosity of the iron sponge makes it readily subdivisible into a fine powder and when reduced to a powder which is substantially impalpable, the individual powder particles are still shot through with minute channels, and their surfaces are pitted and provide sharp projections adapted to penetrate the soft surface of a weed seed.

In the formation of the powder, fragments of iron sponge are placed in a centrifugal comminuting machine, together with a small quantity of iron oxide and lime. Flour and water paste is then introduced and in the comminuting and centrifuging action the sponge iron is reduced to powder form and the minute channels in it act by capillary attraction to avidly absorb the paste together with the iron oxide and lime.

Satisfactory results are accomplished if the amount of paste utilized represents about 5% of the volume of the iron sponge, iron oxide and lime mixture. Exact percentages are not essential, but it is important that no more paste be introduced than can be conveniently and readily absorbed by the iron sponge. The oversupply of paste would result in causing the fine powdered particles to stick together and to clot and cake. The most desirable form of powder is one which is practically dry to the touch and has no caking or clotting tendency.

When this powder is mixed with the water in the primary mixing chamber 10, the adhesive quality of the flour and water paste is further developed by the water absorbed by the lime and the resultant paste mass includes small crystals or grids of cohering sponge iron particles with the space between them filled with the excess water.

When this paste deposits upon the seeds it substantially encases them in a coating consisting of cohering iron particles with moisture entrapped between them. When this coating is subjected to heat and dried the moisture quickly evaporates, leaving a structure very similar to loose grille work encasing the seeds. In the case of smooth-surfaced seeds it will be apparent that a simple agitation will break down the grille work and it will flake and crumble and shake off from hard or polished seed surfaces, if the seeds are even gently tumbled or stirred.

In the case of the other seeds, however, either the entire paste coating or fragments of it will tenaciously adhere. In the rough surfaced or pitted surfaced seeds this is due to the fact that portions of the paste have deposited in pockets where they are inaccessible to a rubbing action or because the adhering paramagnetic particles have found protuberances or projections on the surfaces of the seeds with which they more or less mechanically interlock. This interlocking is particularly true of the hairy surfaced seeds and is enhanced by the sharpness of the sponge iron particles.

The powder may be used for sorting various materials other than seeds although it is peculiarly adapted for seed sorting purposes. Coloring material, either to harmonize or to contrast with the seeds may be added to the paste and will provide a convenient visual indication of the efficiency of the method when the segregated seeds are inspected.

It is interesting to note that under some circumstances I find that the addition of finely divided fibrous material in the nature of jute or flax into the flour and water paste has a tendency materially to increase the adhesiveness of the powder when subsequently combined with water and mixed with the seeds.

The sponge iron particles which are rubbed or shaken from the surface of the seeds may be recovered and re-used, since the agitation to which small groups of such particles are subjected after removal from the seed surfaces, is sufficient to knock the individual particles apart and leave them substantially in the form of the original powder. This powder will be found in the weed seed receptacle 33 and may be readily sifted out.

It will thus be seen that there is herein described composition, method and apparatus in which the several features of this invention are embodied, and which composition, method and apparatus in its action attains the various objects of the invention and is well suited to meet the requirements of practical use.

As many changes could be made in the above composition, method and apparatus, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. A paramagnetic cementitious water-absorbent medium comprising powdered sponge iron, the pores of which contain an adherent mixture, including calcium carbonate and iron oxide.

2. A method of producing a paramagnetic cementitious water-absorbent powder which includes the steps of comminuting sponge iron by centrifugal action in the presence of adherent material adapted to fill the pores of the iron particles.

3. A method of producing a paramagnetic cementitious water-absorbent powder which includes the steps of comminuting sponge iron by centrifugal action in the presence of comminuted calcium carbonate and iron oxide with an excess of water.

Signed at Berlin in the Republic of Germany.

ERNST BRANDUS.